(12) United States Patent
Cedilnik

(10) Patent No.: US 11,193,817 B2
(45) Date of Patent: Dec. 7, 2021

(54) DISTRIBUTED ACOUSTIC SENSING AND SENSOR INTEGRITY MONITORING

(71) Applicant: AiQ Dienstleistungen UG (haftungsbeschränkt), Böblingen (DE)

(72) Inventor: Gregor Cedilnik, Gäufelden (DE)

(73) Assignee: AiQ Dienstleistungen UG (haftungsbeschränkt), Böblingen (DE)

( * ) Notice: Subject to any disclaimer, the term of this patent is extended or adjusted under 35 U.S.C. 154(b) by 164 days.

(21) Appl. No.: 16/737,638

(22) Filed: Jan. 8, 2020

(65) Prior Publication Data

US 2020/0225079 A1      Jul. 16, 2020

(30) Foreign Application Priority Data

Jan. 11, 2019   (EP) ..................... 19151448

(51) Int. Cl.
*G01N 29/00*  (2006.01)
*G01H 9/00*   (2006.01)

(52) U.S. Cl.
CPC .................. *G01H 9/004* (2013.01)

(58) Field of Classification Search
None
See application file for complete search history.

(56) References Cited

U.S. PATENT DOCUMENTS 7,872,736 B2 *   1/2011   Rogers ............... G01M 11/3118
                                                        356/73.1
9,170,149 B2 *   10/2015   Hartog .................... G02B 6/10
(Continued)

FOREIGN PATENT DOCUMENTS

WO   2009056855 A1   5/2009
WO   2017069724 A1   4/2017
(Continued)

OTHER PUBLICATIONS

Shimizu et al.; "Characteristics and Reduction of Coherent Fading Noise in Rayleigh Backscadering Measurement for Optical Fibers and Components", Journal of Lightwave Technology, IEEE, USA, vol. 10, No. 7, Jul. 1, 1992 (Jul. 1, 1992), pp. 982-987, XP000301489, ISSN: 0733-8724, 001: 10.1109/50.144923.
(Continued)

*Primary Examiner* — Lisa M Caputo
*Assistant Examiner* — Nigel H Plumb
(74) *Attorney, Agent, or Firm* — Robert A. Blaha; Smith Tempel Blaha LLC

(57) ABSTRACT

An arrangement for distributed acoustic sensing and sensor integrity monitoring is adapted to operate in a first operation mode and in a second operation mode. In the first operation mode, the arrangement injects a first light pattern (and successively injects a second light pattern having substantially the same wavelength, both light patterns generated using a light launching module, into the fiber; determines a backscatter change between first backscatter dependent light and second backscatter dependent light detected by the detector, to determine a time change of a characteristic of the fiber. In the second operation mode, the arrangement injects another first light pattern and successively another second light pattern; to determine a backscatter average of other first backscatter dependent light and other second backscatter dependent light detected by the detector, to determine a static characteristic of the fiber.

15 Claims, 5 Drawing Sheets

(56) References Cited

U.S. PATENT DOCUMENTS

| | | | | |
|---|---|---|---|---|
| 10,775,230 | B2* | 9/2020 | Suh | G01V 1/22 |
| 2012/0092960 | A1* | 4/2012 | Gaston | G01V 1/226 |
| | | | | 367/35 |
| 2012/0277995 | A1* | 11/2012 | Hartog | E21B 43/26 |
| | | | | 702/8 |
| 2013/0113629 | A1* | 5/2013 | Hartog | G01D 5/35303 |
| | | | | 340/853.2 |
| 2018/0238732 | A1* | 8/2018 | Suh | G01V 1/22 |
| 2020/0225079 | A1* | 7/2020 | Cedilnik | G01H 9/004 |

FOREIGN PATENT DOCUMENTS

| | | | | |
|---|---|---|---|---|
| WO | 2017093588 | A1 | 6/2017 | |
| WO | WO-2017093588 | A1 * | 6/2017 | G01D 5/353 |
| WO | 2017156334 | A1 | 9/2017 | |

OTHER PUBLICATIONS

Izumita, H.; "Fading Noise Reduction in Coherent OTDR", IEEE Photonics Technology Letters, IEEE Service Center, Piscatatway, N.J., US, vol. 4, No. 2, Feb. 1, 1992 (Feb. 1, 1992), pp. 201-203, XP000264812, ISSN: 1041-1135, 001: 10.1109/68.122361.

Lees, G.; "Advances in Optical Fiber Distributed Temperature Sensing Using the Landau-Placzek Ratio", IEEE Photonics Technology Letters, vol. 10, No. 1, Jan. 1998, pp. 126-128, IEEE identifier S 1041-1135(98)00465-0.

Wait, P. C. et al.; "Reduction of Coherent Noise in the Landau Placzek Ratio Method for Distributed Fibre Optic Temperature Sensing", pp. 1-11; Optoelectronics Research Centre, University of Southampton, S017 1BJ, United Kingdom. Date unknown.

* cited by examiner

DISTRIBUTED ACOUSTIC SENSING AND SENSOR INTEGRITY MONITORING

CROSS-REFERENCE TO RELATED APPLICATION

This application claims the benefit of the filing date of the European patent application no. 19151448.8 filed on 11 Jan. 2019, which is incorporated herein by reference in its entirety.

TECHNICAL FIELD

Embodiments of the invention generally relate to to an arrangement and a method for distributed acoustic sensing and sensor integrity monitoring.

TECHNOLOGICAL BACKGROUND

WO 2009/056855 A1 discloses systems and methods for interferometric acoustic monitoring of conduits, wellbores or reservoirs, wherein an optical fiber is used as a distributed interferometer that may be used to monitor the conduit, wellbore or reservoir. The fiber optic sensor is sensitive enough to detect mechanical waves originating from acoustic occurrences/events in the wellbore, reservoir and/or conduit. The mechanical waves interact with the fiber optic sensor and cause a change in the coherent Rayleigh noise (CRN) due to changes in relative positions of scattering sites in the fiber optic sensor due to the interaction between the mechanical wave and the fiber optic sensor. Temperature and pressure changes in the wellbore, reservoir and/or pipeline may change the CRN properties. Time-of-flight measurements of a light pulse along the fiber optic sensor is used in conjunction with the monitored CRN to determine a location in the wellbore or conduit of an acoustic occurrence. Thereby, Distributed Acoustic Sensing (DAS) is achieved.

In optical time domain reflectometry (OTDR), an optical fiber is coupled with an electromagnetic source. A short pulse of light may be launched into the optical fiber, a backscatter signal may be detected and used to provide information regarding the integrity/condition of the optical fiber over location.

Frequency domain reflectometry (OFDR) is an alternative to OTDR where the signal generation and processing is shifted to the frequency domain and intensity modulated continuous light of various modulation frequencies (rather than pulses) is sent into the fiber.

In coherent-OTDR (C-OTDR) coherent homodyne or heterodyne detection is employed where a highly coherent light wave source is coupled to an optical fiber. C-OTDR allows to interfere the weak backscatter signal from the fiber with a local oscillator of same or similar frequency that is coherent to the pulse source (i.e. in defined phase relation). This allows coherent amplification of the weak backscatter to improve the signal to noise ratio of the OTDR measurement. The drawback is that highly coherent light introduces temporal speckles, leading to fading noise which is a quasi-random variation of the backscatter power along fiber location. The observed fading noise is fluctuations in backscattered signals caused by interference among a large number of light waves backscattered at different positions. This decreases the accuracy of distributed optical loss measurement using Rayleigh backscattering.

The publication "Characteristics and Reduction of Coherent Fading Noise in Rayleigh Backscattering Measurement for Optical Fibers and Components" by Shimizu et al., Journal of Lightwave Technology, volume 10, no. 7, July 1992 discloses a study of the characteristics of fading noise in Rayleigh backscattering measurements made with coherent light waves such as coherent-OTDR and coherent-OFDR. Frequency shift averaging is applied effecting fading noise reduction. To reduce fading noise, averaging must be performed for a large number of independent backscatter signals which are sampled at different light wave frequencies, called frequency shift averaging. The origin of fading noise is the stationary nature of the phase correlation between light waves backscattered at different positions along the fiber. The correlation can be reduced by averaging for a large number of independent backscatter signals which correspond to different light frequencies.

The publication "Fading Noise Reduction in Coherent OTDR" by Izumita et al., IEEE Photonics Technology Letters, volume 4, no. 2, February 1992 discloses a reduction in fading noise in coherent OTDR. Thereby, the optical frequency of the light is changed by changing a laser diode temperature during the integrations of the backscattered signal.

For conventional DAS installations, the proper operation of the sensor fiber, i.e. light transport along the range of interest is of vital importance. There is a need to check a fiber before putting a DAS system into operation and also to check or monitoring the integrity. For that conventionally a separate OTDR instrument is used. This requires Needs Additional hardware (e.g. a separate OTDR apparatus);

Needs personnel to re-/connect the fiber to respective instrument and access to the fiber connector. This may be difficult in some cases, like in remote regions—or an additional system for controlling and switching optically stationary installed DAS and OTDR systems to the sensor;

The OTDR measurement does naturally not cover the connection between DAS interrogator and sensor fiber (as this connection is opened to connect the OTDR), problems like a damaged DAS connector may be undetected. Even more, re/connecting the sensor between those instruments bears the additional risk of contaminating/damaging the connection;

It is not possible to perform DAS and OTDR measurements at the same time (live fiber monitoring).

SUMMARY

Thus, there may be a need for an arrangement and a method for distributed acoustic sensing and sensor integrity monitoring which reduces complexity and required hardware and which allows high accuracy distributed acoustic sensing.

An arrangement and a method for distributed acoustic sensing and sensor integrity monitoring is described by the subject-matter of the independent claims. The dependent claims specify particular embodiments of the present invention.

According to an embodiment of the present invention an arrangement for distributed acoustic sensing and sensor integrity monitoring is provided. The arrangement, comprises: a light launching module adapted to generate light patterns and arranged to inject the generated light patterns into an optical fiber; a detector arranged to detect Rayleigh backscatter dependent light returned from the optical fiber, wherein the arrangement is adapted to operate in a first operation mode and in a second operation mode. In the first operation mode, the arrangement is adapted: to inject a first light pattern and to successively (e.g. subsequently, later, after all backscatter of the first light pattern left the optical fiber) inject a second light pattern having substantially the same wavelength (e.g. same wavelength or only slightly different wavelength), both generated using the light launching module, into the fiber; to determine a backscatter change (e.g. spatially resolved for different positions along the fiber) between first backscatter dependent light (e.g. first backscatter light or first backscatter light interfered with reference light) and second backscatter dependent light (e.g. second backscatter light or second backscatter light interfered with reference light) detected by the detector; to analyze the backscatter change to determine a time change of a characteristic of the fiber. In the second operation mode, the arrangement is adapted: to inject another first light pattern (e.g. same as or different from the first light pattern) and successively another second light pattern (e.g. same as or different from the second light pattern) in particular having a wavelength different from a wavelength of the other first light pattern, both generated using the light launching module, into the fiber; to determine a backscatter average (e.g. spatially resolved for different positions along the fiber) of other first backscatter dependent light and other second backscatter dependent light detected by the detector; to analyze the backscatter average to determine a (quasi-)static characteristic of the fiber.

According to another exemplary embodiment of the invention, a method of distributed acoustic sensing and sensor integrity monitoring comprises in a first operation mode: injecting a first light pattern and successively injecting a second light pattern having substantially the same wavelength both generated using the same light launching module, into an optical fiber; determining a backscatter change between first backscatter dependent light and second backscatter dependent light detected by a detector; and analyzing the backscatter change to determine a time change of a characteristic of the fiber; in a second operation mode: injecting another first light pattern and successively another second light pattern, both generated using the light launching module, into the fiber; determining a backscatter average of other first backscatter dependent light and other second backscatter dependent light detected by the detector; and analyzing the backscatter average to determine a static characteristic of the fiber.

OVERVIEW OF EMBODIMENTS

The light launching module may be capable of generating highly coherent light, for example light having a coherence length that is at least as long as a length of one or more injected light patterns. The light launching module may comprise a single laser generating light of substantially a single frequency which may depend in particular on the temperature of the light launching module. By changing the temperature of the light launching module, the frequency and thereby wavelength of the generated light may be changed. The wavelength may alternatively or additionally be changed by suitable components like an acousto-optic modulator (AOM) or optical phase shifter like electro-optic modulator (EOM) or Piezo shifter. The frequency of the light may be changeable in a range within the interval between 1 GHz and 250 GHz, or between 5 GHz and 50 GHz, for example in a range having a width of 10 GHz around a center frequency. The center frequency may for example reside within the infrared light wavelength range or frequency range. For wavelength near 1500 nm, the wavelength may for example be changeable in a range within the interval between 0.01 nm and 2 nm, or between 0.04 nm and 0.4 nm around a center wavelength.

The light launching module may comprise a light generation portion, such as a laser, and one or more further light modulating components, such as an AOM Acoustic Optical Modulator, being capable of forming light patterns having desired characteristics, for example with respect to intensity profile, pulse characteristics, polarization and so on. The light patterns may be characterized by a particular intensity profile or shape (intensity for different times). A light pattern may for example comprise one or more pulses, such as rectangular pulses or may be characterized by a continuous light output having a particular intensity profile. According to a particular embodiment, each light pattern comprises only a single pulse, such as an essentially rectangular pulse or a Gauss curve shaped pulse.

The detector may be configured as a photodetector which may be capable of detecting the Rayleigh backscattered dependent light over time. The Rayleigh backscattered dependent light may be light which depends on Rayleigh backscatter of the injected light. Rayleigh backscatter may be characterized as comprising light having wavelengths substantially same wavelength as the wavelength of the injected light. The Rayleigh backscattered dependent light may either be Rayleigh backscatter light or may be interference light obtained by interfering the Rayleigh backscatter light with other light, such as reference light (also called local oscillator light).

The arrangement may be configured to operate in the first operation mode and the second operation mode either successively or quasi simultaneously or in an interlaced or interdigitated manner. For operating the arrangement in the first operation mode and the second operation mode, the same hardware may be utilized. As a difference, the wavelength or frequency of the light generated by the light launching module may be changed for example with a higher rate in the second operation mode than in the first operation mode. Furthermore, processing the detected signals may be different in the first and the second operation mode which may be achieved by executing different software code.

The first light pattern may have substantially the same characteristics as the second light pattern, for example regarding wavelengths and/or polarization state and/or pattern length, pattern intensity profile or containing pulses. Ideally, the first light pattern may have exactly the same wavelength and frequency as the second light pattern. However, a small deviation between the wavelength of the first light pattern and the second light pattern may be tolerated, as long as a time change of a characteristic of the fiber (for example regarding acoustic wave induced changes in the refractive index) are derivable by analyzing the backscatter change.

In particular, at any point in time (while operating in the first operation mode or operating in the second operation mode) only one light pattern may be present within the optical fiber and only backscatter due to one single light pattern may be present within the fiber. A next light pattern may only be injected into the optical fiber when all backscatter due to a previous light pattern has left the optical fiber.

The first backscatter dependent light may be light which depends on first backscatter light, i.e. light which is due to backscattering of the first light pattern. Similarly, the second backscatter dependent light is light which depends on second backscatter light (i.e. light which is due to backscattering of the second light pattern). The detector may either directly detect first backscatter light and second backscatter light or may detect light which is obtained by interfering the first backscatter light with reference light and which is obtained by interfering the second backscatter light with reference light, respectively. Thereby, different architectures of conventional DAS configurations may be supported.

The backscatter change (signal) may be for example obtained as a difference between (an intensity of) the first backscatter dependent light and (an intensity of) the second backscatter dependent light, in particular a difference between the intensities of the first backscatter dependent light and the second backscatter dependent light, respectively. The backscatter change may be indicative of a change of the light propagation speed along the fiber, spatially resolved for all locations along the optical fiber. The light propagation speed change may for example be caused by external disturbances, such as acoustic disturbance and/or mechanical strain and/or temperature change of the optical fiber, affecting the refractive index of the fiber and/or the path length. Thereby, in the first operation mode, the arrangement may be capable of performing distributed acoustic sensing (DAS). The time change of the characteristic may be due to or may comprise an oscillating change (e.g. in a frequency range between 1 Hz and 100 kHz, in particular between 5 Hz and 10 kHz) of the characteristic, such as fiber mechanical strain.

DAS (Distributed acoustic sensing) may be based on coherent OTDR architecture, wherein the change in the backscatter from pulse to pulse or over higher number of pulses per fiber location is analyzed. The change may refer to the backscatter intensity or in other systems also the optical phase. The backscatter may respond to changes in optical path length in the fiber as caused by temperature changes and mechanical forces, including acoustic pressure variations. Path length variations in the scale of the wavelength and below may affect the backscatter intensity and optical phase, i.e. path length changes in the nanometer scale can be detected. The wavelength must be sufficiently stable during the first operation mode so that changes in the backscatter intensity and/or phase can be attributed to optical path length changes.

At locations along the fiber where little or no light is returning to the instrument due to signal fading, acoustic sensing has a bad SNR or may even be impossible. SNR is also affected by losses along the fiber, which includes the "ideal" attenuation of a given fiber (often within a cable) and losses caused by connectors and other optical components along the path. Losses may increase due to excessive stress or bends on the cable, kinks, contusions, bad splices or connectors or others incidents affecting the light propagation along the fiber. Such losses may disturb the DAS measurement or even make DAS measurements impossible. Therefore, monitoring the integrity of the system and locating incidents by operating in the second operation mode is advantageous.

The other first light pattern and the other second light pattern may have similar or same characteristics in terms of an intensity profile over time, for example may have or may comprise a same number of pulses, in particular comprising one pulse each having same intensity profile, such as a rectangular pulse. The other first light pattern and the other second light pattern may also have same or similar polarization state. However, the other first light pattern and the other second light pattern may have different wavelengths, in particular such that by averaging the other first backscatter dependent light and the other second backscatter dependent light fading noise due to speckle effects is reduced. The same light launching module, in particular the same laser may be utilized for generating the first light pattern, the second light pattern, the other first light pattern and the other second light pattern.

The other first backscatter dependent light may be light which may depend on first backscatter light, i.e. light which is due to backscattering of the other first light pattern. The other second backscatter dependent light may be light which is dependent on second backscatter light, i.e. light which is due to backscattering of the other second light pattern. The other first backscatter dependent light may for example be the other first backscatter light or light which is obtained by interfering the other first backscatter light with reference light. Furthermore, the other second backscatter dependent light may for example be the other second backscatter light or light which is obtained by interfering the other second backscatter light with reference light.

For the arrangement only a single detector or single detector system may be provided for detecting the first backscatter dependent light, the second backscatter dependent light, the other first backscatter dependent light and the other second backscatter dependent light. A detector system may comprise a balanced detector (i.e. a detector pair) to detect the optical power difference between conjugate arms of the combiner of backscatter with local oscillator and/or a detector set to detect the I and Q part, respectively, of backscatter and local oscillator interfering in an I/Q demodulation arrangement.

The static characteristics of the fiber may comprise physical properties (such as the optical loss) of the fiber that do not oscillate (or at least having oscillation frequency smaller than for example 1 Hz). However, the static characteristics may (e.g. slowly such as due to aging or very abruptly such as due to impact) change over time, such as due to break and/or damage and/or aging temperature change and/or mechanical stress of the fiber and/or a connector connecting the optical fiber to the light launching module. Determining the static characteristics of the fiber and/or the connector may thereby allow to monitor the integrity of the sensor utilized for distributed acoustic sensing which may be applied in the first operation mode.

In the second operation mode OTDR (Optical Time Domain Reflectometry) may be performed, e.g. to determine the quality of glass fiber installation, allowing to locate and quantify losses along the fiber due to bad splices or connector, losses due to bends or fiber breaks and other disturbances affecting the attenuation of the fiber. Thereby, a light pulse may be sent into the fiber and the Rayleigh backscatter intensity over time may be measured. The time corresponds to a certain distance in the fiber, defined by the time of flight for the light forth and back. The loss along the distance is then referred to as "loss trace". To increase the sensitivity for higher distances or shorter measurement times or finer spatial resolution, coherent approaches may be applied, often referred to as c-OTDR. When the coherence length of the light pulse approaches the pulse length and beyond, the backscatter from the fiber shows coherence effects, which can be called temporal speckles or local fading, leading to loss traces with superimposed speckle noise. This variation in backscatter intensity along the trace is due to the fact, that the natural Rayleigh backscatter is caused by quasi-randomly distributed inhomogeneities along the fiber, leading to a quasi-random superposition of reflections along the pulse length and thus to constructive and destructive interference in the total sum on the detector. This can lead to the case that from certain (quasi-random) locations the light cancels out and the intensity goes down to (near to) zero at those locations ("signal fading"). To overcome this coherent noise, variation of the laser frequency from pulse to pulse and averaging of respective backscatter traces may be performed. Similar techniques like OFDR (Optical Frequency Domain Reflectometry) that shift the measurement from the time to the frequency domain, but do essentially the same, may also be applied.

The arrangement may mainly be operated in the first operation mode, the second operation mode may only be entered before putting an installation into regular operation as part of a site acceptance test (SAT) or when integrity monitoring is required, such as on a timely regular basis, for example once a day, once a week or once a month.

In particular, for applying sensor integrity monitoring, no manual interference for example by personnel may be required. For example, it may not be required to disconnect the optical fiber from the light launching module and connect the optical fiber to an additional equipment adapted to perform integrity monitoring. Instead, the optical fiber may be kept connected or coupled to the light launching module. Thereby, fast switching between the two operation modes may be enabled.

Thereby, an improved DAS system that includes the ability for OTDR type measurements (to check the sensor integrity) may be provided, which may include the connection between DAS instrument and fiber, and/or which may use the existing core components of a DAS (like highly coherent laser, optical amplifier, circulator, detector).

According to an embodiment of the present invention, the arrangement further comprises a connector coupled to the light launching module and connectable to the optical fiber, wherein the arrangement is adapted to determine a static characteristic of the connector by operating in the second operation mode.

The arrangement may also comprise the optical fiber and the connector may be connected to the optical fiber. During operation in the second operation mode, the light patterns generated by the light launching module may be injected through the connector into the optical fiber. In particular, also backscatter light originating from the light backscattered within the region around the connector is detected by the detector, allowing to monitor the integrity also of the connector (e.g. detected as backscatter level difference before versus behind the connector). In conventional systems which require to connect, via the connector, an external sensor integrity monitoring equipment, monitoring the connector for damage (and/or changes), or in general static characteristic may not be possible.

However, the connector may be prone to damage or deterioration which may result in considerable losses. Thereby, the accuracy of distributed acoustic sensing may be reduced.

According to embodiments of the present invention, it is enabled to monitor the integrity of the connector, in general to monitor the static characteristic of the connector, thereby enabling detecting structural damages of the connector, which negatively affect the distributed acoustic sensing performed in the first operation mode. Thereby, it is enabled to exchange a faulty or damaged connector by an intact one.

According to an embodiment of the present invention, in the first operation mode the arrangement is adapted: to inject a light pattern sequence comprising successive light patterns including the first light pattern and the second light pattern, pairs of immediately successively injected light patterns having essentially a same wavelength; to determine a backscatter change sequence between successive backscatter light portions due to successive backscatter form the light pattern sequence; to analyze the backscatter change sequence to determine a time evolution of the characteristic of the fiber.

In particular, all light patterns of the light pattern sequence may be same or similar regarding intensity profiles, polarization state, substantially same wavelengths and so forth. The successive light patterns may for example be injected on a regular time basis, having a fixed repetition period.

The backscatter change, as well as the backscatter average, are understood to comprise a trace of the backscatter change/backscatter average over all positions along the optical fiber. Measurement of the time-of-flight (the time between launching the pattern into the fiber and detecting backscatter dependent light at the detector) may enable the conversion of a detection time to identify a particular position along the optical fiber.

The time evolution of the characteristic of the fiber may for example reflect a time evolution of the refractive index or fiber strain (for different positions along the fiber) which may for example be due to acoustic disturbance close to the fiber, for example for monitoring a pipeline, a power cable or the like.

According to an embodiment of the present invention, the other first light pattern and the other second light pattern differ in at least one parameter affecting a coherent backscatter speckle profile (e.g. speckle intensity along the fiber), in particular have different wavelengths and/or different polarization states and/or different intensity profiles and/or pulse lengths.

The speckle profile may be understood as speckle caused intensity profile due to reflection at different positions along the fiber. The detector will detect a temporal speckle pattern or temporal speckle profile which may however be converted into a spatial speckle profile when the time-of-flight is considered. The speckle profile may comprise an intensity variation along the fiber. The wavelength may for example be a parameter which affects a coherent backscatter speckle profile. Other parameters may comprise polarization state and/or different intensity profiles and/or pulse lengths. Due to changed polarization state and/or different intensity profiles and/or pulse lengths also the backscatter from the scattering locations along the fiber will change and result in changed interference pattern.

According to an embodiment of the present invention, in the second operation mode, the arrangement is adapted: to inject another light pattern sequence comprising successive other light patterns including the other first light pattern and the other second light pattern, pairs of immediately successively injected other light patterns having in particular differing wavelengths and/or differing polarization states; to determine the backscatter average based on an average over the other successive backscatter dependent light portions due to successive backscatter form the other light pattern sequence and/or wherein the backscatter average comprises a spatially resolved backscatter for different regions along the fiber and/or the connector. The backscatter average may be the average over the other successive backscatter dependent light portions, if the backscatter light portions are directly detected by the detector (without being interfered with reference light).

The backscatter average may be an amplitude (or amplitude related quantity) derived from a heterodyne beat signal obtained as the average over the other successive backscatter dependent light portions, if the backscatter light portions are interfered with reference light of different optical frequency (e.g. having a particular carrier frequency, e.g. deviating from the injected light frequency preferably by between 40

MHz and 1000 MHz or even higher, e.g. around 40 MHz or 80 MHz or multiples of these frequencies) and the interference light is detected or derived from the signal resulting from interference with reference light of same optical frequency (homodyne). Arrangements with more than one interference detection from reference light with different optical phase offsets may be used, e.g. differing by 180° (resulting in two optical signals to be detected by a balanced detector) or differing by 90° or a multiple of 90° (to apply an I/Q demodulation scheme) or by 120° or a multiple of 120° (like with a 3-arm interferometer).

Injecting the other light pattern sequence may allow to average respective backscatter dependent light portions over many patterns injected, thereby improving the reduction of fading noise. For example, in the second operation mode, averages may be taken over at least 100, in particular over at least 500 backscatter light portions. All backscatter dependent light portions averaged may be due to injected light patterns having different wavelengths and/or polarization and/or other parameters affecting the speckle profile. Thereby, effective integrity monitoring of the optical fiber and/or the connector may be provided.

To reduce fading noise sufficiently, a sufficient statistical variety of backscatter traces with respective speckle noise is required to be averaged. If e.g. the laser light power is lower at some particular wavelength than at other wavelengths, the resulting particular backscatter trace would be lower than other backscatter traces due to the other injected wavelengths as well. Averaging with same weights its backscatter trace with the (statistically independent) other backscatter traces would result in a lower contribution of this particular backscatter trace in the average. Statistically it may therefore be advantageous to increase the weight of such particular backscatter trace in the average calculation.

According to another example, if the wavelength difference between two backscatter traces is small so that their speckle patterns are statistically related, they should be weighted lower than two other backscatter traces having a greater wavelength difference for best statistical noise averaging.

In the case two backscatter traces having the same wavelength are detected, they would result in the same speckle pattern. In the total average with other (independent) speckle patterns (due to other backscatter from light having different wavelength) these both should contribute with a lower weight (e.g. both with half the weight or one with full weight and the other with zero weight, i.e. discarded).

According to an embodiment of the present invention, to determine the backscatter average of the other first backscatter dependent light and other second backscatter dependent light or over the other successive backscatter dependent light portions comprises: weighting the other first backscatter dependent light and the other second backscatter dependent light or the other successive backscatter dependent light portions, in order to apply a normalization regarding injected light power and/or number (or density) of detections of the backscatter dependent light portions per wavelength sub-range $\Delta\lambda$ (a range where a certain level of statistical relation as discussed above remains, e.g. per 50 MHz sub-range if expressed in units of optical frequency, depending on wavelength, and pulse length), in particular including: weighting those other backscatter dependent light portions the higher, the lower the injected light power of the respective other light pattern; and/or weighting those other backscatter dependent light portions the higher, the smaller the number (or density) of detections of the backscatter dependent light portions in respective wavelength sub-range of the associated injected other light patterns; and/or weighting those other backscatter dependent light portions the smaller, the smaller a wavelength change rate of the associated injected other light patterns. For example, other backscatter dependent light may be weighted the higher, the lower the injected light power is. E.g., the backscatter average may be derived as a sum over the detected intensities of the backscatter dependent light portions multiplied with the inverse of the respective number (or density) of detections of the backscatter dependent light portions in the respective wavelength sub-range (e.g. $\lambda+\Delta\lambda$) around the wavelength (e.g. $\lambda$) of the injected light.

In particular, according to embodiments of the present invention, all light patterns may have the same or at least similar light power or light energy (power integrated over the pattern length). For example, during the second operation mode, the wavelength of the light generated by the light launching module may continuously be changed with a constant or changing wavelength change rate. If the wavelength change rate is not constant, but varying, those backscatter dependent light portions which originate from backscattered light due to injected light while the change rate is relatively low may be rated lower than backscatter dependent light portions which are due to backscattering from injected light where the wavelength change rate is higher. The weighting may be such that in the average, all applied wavelengths sub-ranges have a same or similar contribution.

According to an embodiment of the present invention, an absolute value of a light frequency difference between the first light pattern and the second light pattern or between subsequent light patterns of the light pattern sequence is between 0 Hz and 500 MHz divided by a light pattern length in ns, in particular between 0 Hz and 200 MHz divided by a light pattern length in ns, further in particular between 0 Hz and 100 MHz divided by a light pattern length in ns, wherein an absolute value of another light frequency difference between the other first light pattern and the other second light pattern or between subsequent light patterns of the other light pattern sequence is greater than 0 Hz, in particular greater than 10 Hz, or greater than 1 kHz, or greater than 10 kHz, or greater than 1 MHz, and/or smaller than 2.5 GHz, and/or smaller than 1 GHz and/or smaller than 500 MHz.

For the first operation mode it may be ideal to utilize light patterns having exactly the same frequency and thereby same wavelengths. If the frequency difference is larger than 500 MHz divided by the pulse length in nanometers (nm), the optical phase changes across the pulse length by $\pi$ (Pi), meaning that the backscatter signal is considerably altered from pulse to pulse without any acoustic event. This would cause significant acoustic noise.

As an example, a pulse may have a length of 100 ns (which correspond to an interfering span of about 10 m in the optical fiber). In this case, in the first operation mode, the frequency change between two subsequent first and second light patterns may be up to ±5 MHz (=500 MHz/100), in particular below ±1 MHz.

In the second operation mode, the frequency and thereby the wavelength of the utilized other light patterns must be different from zero, in order to obtain any changes of the speckle profile by wavelength change. In the second operation mode, typically much more than 100 traces may be averaged, i.e. much more than 100 other backscatter dependent light may be averaged. If immediately subsequent other light patterns of the other light pattern sequence differ in frequency by 2.5 GHz (corresponding to 0.02 nm wavelength difference at 1550 nm) the total covered wavelength range would be much more than 2 nm. This may not be feasible any more with the extremely coherent light source and which would also fall outside the wavelength range of other components of the arrangement, for example the window of the filter, which may be for example 100 GHz=0.8 nm. The light source may comprise a laser which may be capable of changing the wavelength in a range of 0.1 nm (10 GHz). A DFB laser may be utilized according to other embodiments which may be capable of generating light having wavelengths differing up to 1.6 nm (corresponding to 200 GHz).

According to an embodiment of the present invention, the first operation mode provides distributed acoustic sensing and/or distributed temperature gradient sensing, wherein the second operation mode provides fiber and/or connector integrity monitoring.

According to an embodiment of the present invention, the time evolution of the characteristic of the fiber comprises information regarding strain and/or acoustic disturbance and/or pressure and/or temperature of the fiber in different regions of the fiber at different time points and/or wherein the static characteristic comprises information regarding loss and/or defect and/or integrity and/or light transport property in different regions of the fiber and/or the connector and/or other optical components in the light path. Thereby, an arrangement combining the capabilities of distributed acoustic sensing and integrity monitoring is provided.

According to an embodiment of the present invention, the arrangement is adapted to operate in the first operation mode and to successively operate in the second operation mode.

According to this embodiment, the other first light pattern (and the other second light pattern) is injected after all backscatter due to backscattering from fiber regions of the first light pattern and the second light pattern has left the optical fiber. For example, during the first operation mode, the wavelength of the light generated by the light launching module may be constant, for example by keeping the light launching module at a constant temperature. Conversely, during the second operation mode, the wavelength of the light generated by the light launching module may continuously be changed, for example by continuously changing (for example increasing or decreasing) the temperature of the light launching module.

According to an embodiment of the present invention, the arrangement is adapted to operate in the first operation mode and to simultaneously or quasi simultaneously, or interdigitatedly, operate in the second operation mode, wherein the first light pattern serves as the other first light pattern, and/or wherein the second light pattern serves as the other second light pattern, or wherein the other first light pattern is injected after injection of the first light pattern but before injection of the second light pattern, and the other second light pattern is injected after injection of the second light pattern. Alternatively or additionally, a sub-set of the light patterns may be used as the other light patterns, e.g. every 10th or every 100th or every 1000th measurement of measurements processed and used during the first operation mode may be processed and used also for the second operation mode.

According to embodiments of the present invention, the first light pattern serves as the other first light pattern and the second light pattern serves as the other second light pattern. In this embodiment at least two light patterns are injected.

In other embodiments, the first light pattern serves as the other first light pattern but the second light pattern does not serve as the other second light pattern. In this embodiment, thereby, at least three light patterns are injected.

In still other embodiments of the present invention, none of the first or second light pattern serve as any of the other first light pattern or the other second light pattern.

If the first/second light pattern and the other first/second light pattern are injected in an interdigitated manner, it may be difficult to change the wavelength or keep the wavelength (substantially) constant as required in the second operation mode and the first operation mode, respectively, by thermal wavelength tuning. Using frequency shifting components (like AOM or EOM) on the other hand may allow quickly changing and restoring of an optical frequency.

According to an embodiment of the present invention, to analyze the backscatter average comprises: comparing the backscatter related average with a reference trace to determine the static characteristic of the fiber and/or connector. The reference trace may have been previously determined by measurement for example of an intact sensor or during a site acceptance test (SAT), in particular the fiber and/or the connector(s) and/or splices. If the backscatter average deviates by more than a threshold from the reference trace, it may be inferred that the fiber and/or connector is damaged or appointed for (preventive) maintenance.

According to an embodiment of the present invention, the first backscatter light and the second backscatter light comprises or is Rayleigh backscatter of the first light pattern and the second light pattern, respectively, in particular backscattered from different regions of the fiber, wherein the other first backscatter light and the other second backscatter light comprises or is Rayleigh backscatter of the other first light pattern and the other second light pattern, respectively, in particular backscattered from different regions of the fiber and/or the connector.

Rayleigh backscatter may be characterized in that the wavelength of the backscattered light is the same as the wavelength of the injected light. The Rayleigh backscatter of a single light pattern may comprise backscatter from different positions along the fiber which may be timely resolved by the detector and which may be reconverted into a backscatter intensity versus the position along the fiber, also called backscatter trace.

According to an embodiment of the present invention, the light launching module comprises a single laser and is adapted to generate coherent light patterns with tunable wavelength, in general by means of changing the laser resonator length, in particular involving temperature control. Thereby, hardware may be simplified.

According to an embodiment of the present invention, the light launching module comprises an optical element behind (i.e. in the light path downstream) the laser (or in general a light source) configured to tune the optical frequency, the optical element comprising an Electro-Optic Modulator (EOM) and/or Acousto-Optic Modulator (AOM) and/or a Piezo-based phase shifter.

The arrangement may comprise a temperature control module which is adapted to control the temperature of the light launching module. Controlling the temperature of the light launching module may enable to control the wavelength of the light as generated by the light launching module.

It should be understood, that features, individually or in any combination, disclosed, described, explained or provided for an arrangement for distributed acoustic sensing and sensor integrity monitoring also apply, individually or in any combination, to a method of distributed acoustic sensing and sensor integrity monitoring according to embodiments of the present invention and vice versa.

DETAILED DESCRIPTION OF ILLUSTRATED EMBODIMENTS

Figure 1:
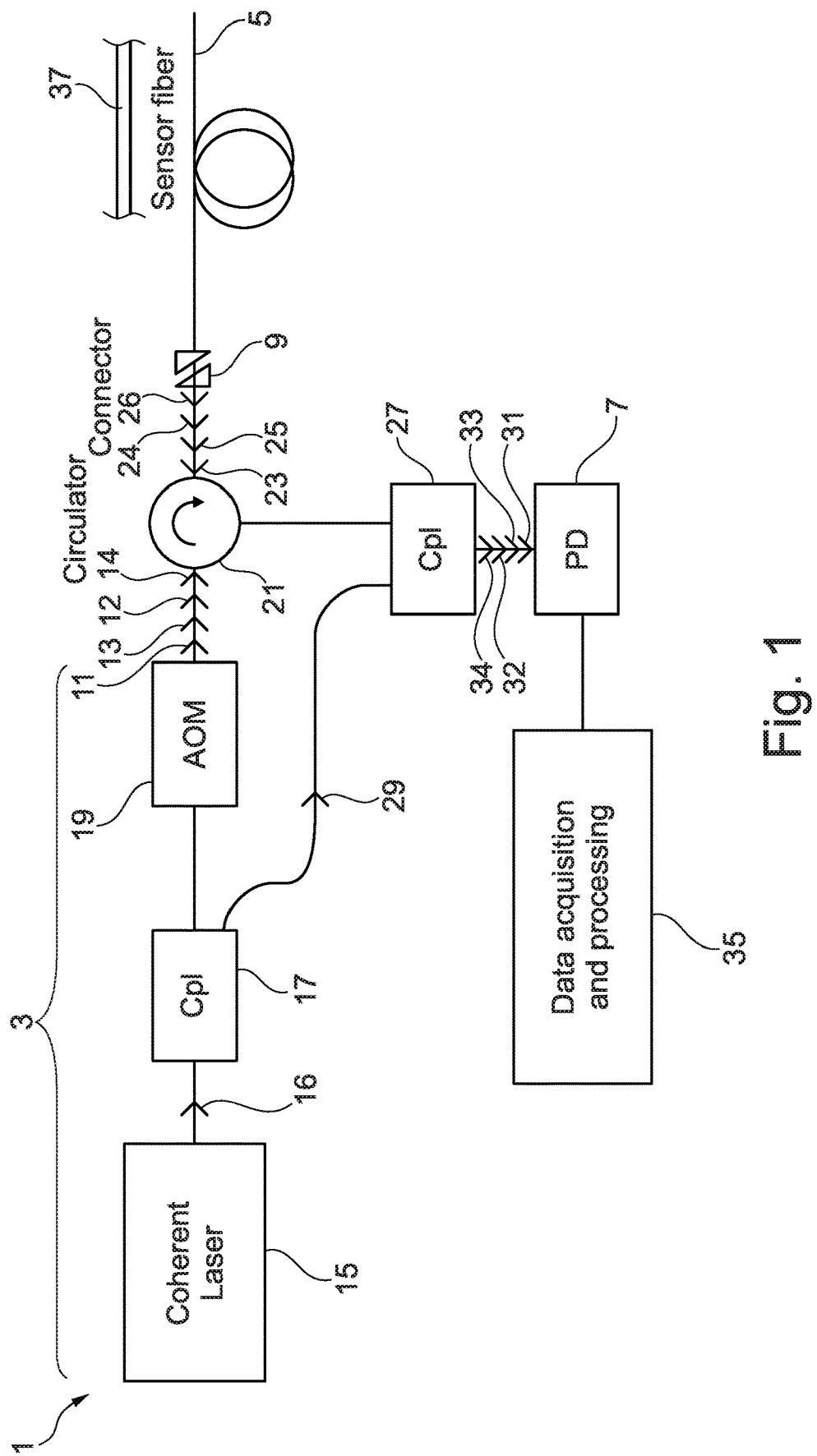
FIG. 1 schematically illustrates an arrangement for distributed acoustic sensing and sensor integrity monitoring according to an embodiment of the present invention.

The arrangement 1 for distributed acoustic sensing and sensor integrity monitoring schematically illustrated in FIG. 1 comprises a light launching module 3, here comprising a coherent laser 15, which is adapted to generate light patterns and is arranged to inject the generated light patterns into an optical fiber 5. Further, the arrangement 1 comprises a photo detector 7 which is arranged to detect Rayleigh backscatter dependent light returned from the optical fiber 5 and also from a connector 9. The arrangement 1 is arranged to operate in a first operation mode and in a second operation mode, either successively or quasi simultaneously or concurrently, in particular in an interdigitated manner.

In the first operation mode, the arrangement injects a first light pattern 11 and successively injects a second light pattern 13 having substantially the same wavelengths and both being generated using the light launching module 3. Thereby, the light launching module 3 comprises a coherent light source, in particular configured as a coherent laser light source 15, comprises a coupler 17 and comprises a pulse forming (and frequency shifting) module 19. Via a circulator 21, the generated first light pattern 11 and second light pattern 13 are coupled into the optical fiber 5 via the connector 9.

First backscatter light 23 returns from the optical fiber 5 and the connector 9 due to Rayleigh backscattering of the first light pattern 11. Similarly, also second backscatter light 25 returns from the optical fiber 5 and the connector 9 due to Rayleigh scattering of the second light pattern 13 at different locations along the optical fiber 5 or of the connector 9.

Via the circulator 21, the backscatter lights 23, 25 are guided to a coupler 27 at which the backscatter lights 23, 25 are interfered with reference light 29 which has been branched off from the light 16 as is generated by the coherent laser 15. Interfering the first backscatter light 23 with the reference light 29 results in first backscatter dependent light 31 which is detected by the detector 7. Furthermore, interfering the second backscatter light 25 with the reference light 29 results in second backscatter dependent light 33 which is also detected by the detector 7. The detector 7 provides intensity signals reflecting the intensity of measured light to the data acquisition and processing module 35 which determines a backscatter change between the first backscatter dependent light 31 and the second backscatter dependent light 33. The backscatter change is then analyzed to determine a time change of a characteristic of the fiber, in particular time change of a refractive index which may have been caused by an acoustic event close to the optical fiber 5 which is for example arranged in particular buried close to an object 37 to be monitored, such as a pipeline or an electric cable, in particular buried in the soil. Thereby, distributed acoustic sensing is enabled by the arrangement 1.

In the second operation mode, the arrangement injects another first light pattern 12 and successively another second light pattern 14 into the optical fiber, via the connector 9, wherein both patterns are generated using the light launching module 3. Due to Rayleigh scattering at different scattering sides along the fiber 5 and/or connector 9, other first backscatter light 24 generated by backscattering of the other first light pattern 12 returns from the optical fiber 5 and is interfered at the coupler 27 with the reference light 29 to result in other first backscatter dependent light 32 which is detected by the detector 7. Due to backscattering of the other second light pattern 14 along the optical fiber 7 and/or the connector 9, other second backscatter light 26 is generated which is interfered with the reference light 29 resulting in other second backscatter dependent light 34 which is also detected by the detector 7.

In other embodiments, the photodetector 7 may directly detect the first backscatter light 23, the second backscatter light 25, the other first backscatter light 24 and the other second backscatter light 26 instead of the backscatter lights interfered with the reference light 29.

In the second operation mode, the data acquisition and processing module 35 determines a backscatter average of the other first backscatter dependent light 32 and the other second backscatter dependent light 34 and analyzes the backscatter average to determine a static characteristic of the fiber 5 and/or the connector 9.

The arrangement 1 illustrated in FIG. 1 is capable of carrying out a method of distributed acoustic sensing and sensor integrity monitoring according to an embodiment of the present invention.

Figure 2:
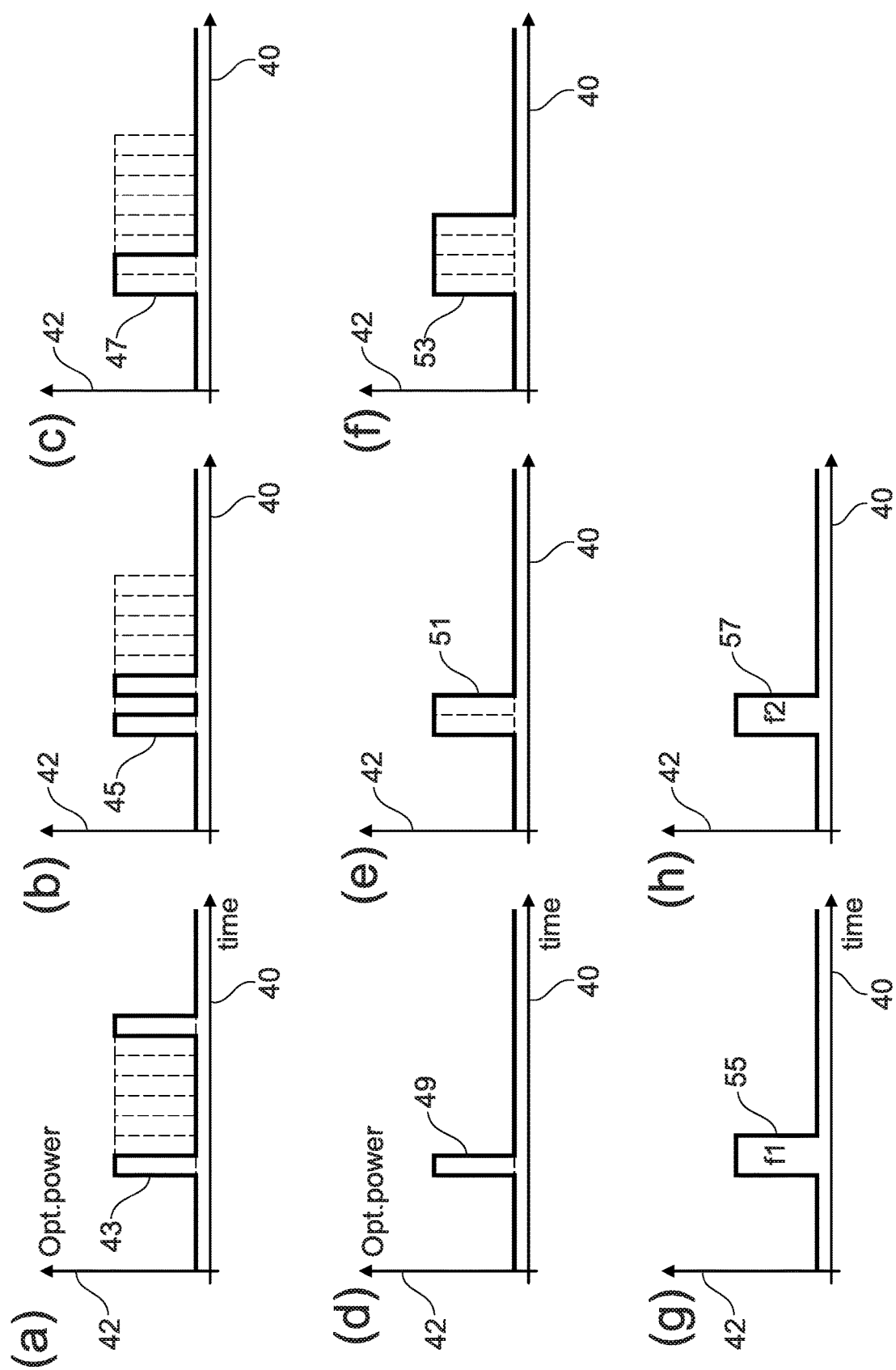
FIG. 2 illustrates graphs representing light patterns as may be employed by the arrangement illustrated in FIG. 1.

FIG. 2 illustrates examples of light patterns as may be employed in embodiments of the present invention. Thereby, the abscissas 40 of the graphs (a) to (h) indicate the time, while the ordinates 42 denote the optical power of the corresponding light. Each of the graphs (a) to (h) in FIG. 2 illustrates an example of a light pattern. These light patterns may repetitively be injected into the optical fiber on a regular basis.

Thereby, the intensity profiles 43, 45, 47, 49, 51, 53 of the light patterns illustrated in FIG. 2 (a) to (f) are examples of a first light pattern and/or a second light pattern injected into the optical fiber during the first operation mode. The intensity profile 43 comprises essentially two rectangular pulses having same widths and being spaced apart by six pulse lengths. The pattern profile 45 comprises two rectangular pulses spaced apart by one pulse width. The intensity profile 47 comprises of a single pulse having twice the width as the pulses illustrated in FIGS. 2 (a) and (b). The traces 49, 51, 53 illustrated in FIGS. 2 (d) to (f) comprise each a single pulse having rectangular shape but having different widths.

The traces 55 and 57 illustrated in FIGS. 2 (g) and 2 (h), respectively, represent examples of another first light pattern and another second light pattern, respectively as may be injected during the second operation mode. Thereby, the intensity profiles 55, 57 are identical showing a single pulse having rectangular shape. However, different from the intensity profiles illustrated in FIGS. 2 (a) to 2 (f), the light from which the light patterns 55, 57 are formed have different wavelengths or different frequencies, namely a frequency f1 and a frequency f2, respectively.

Figure 3:
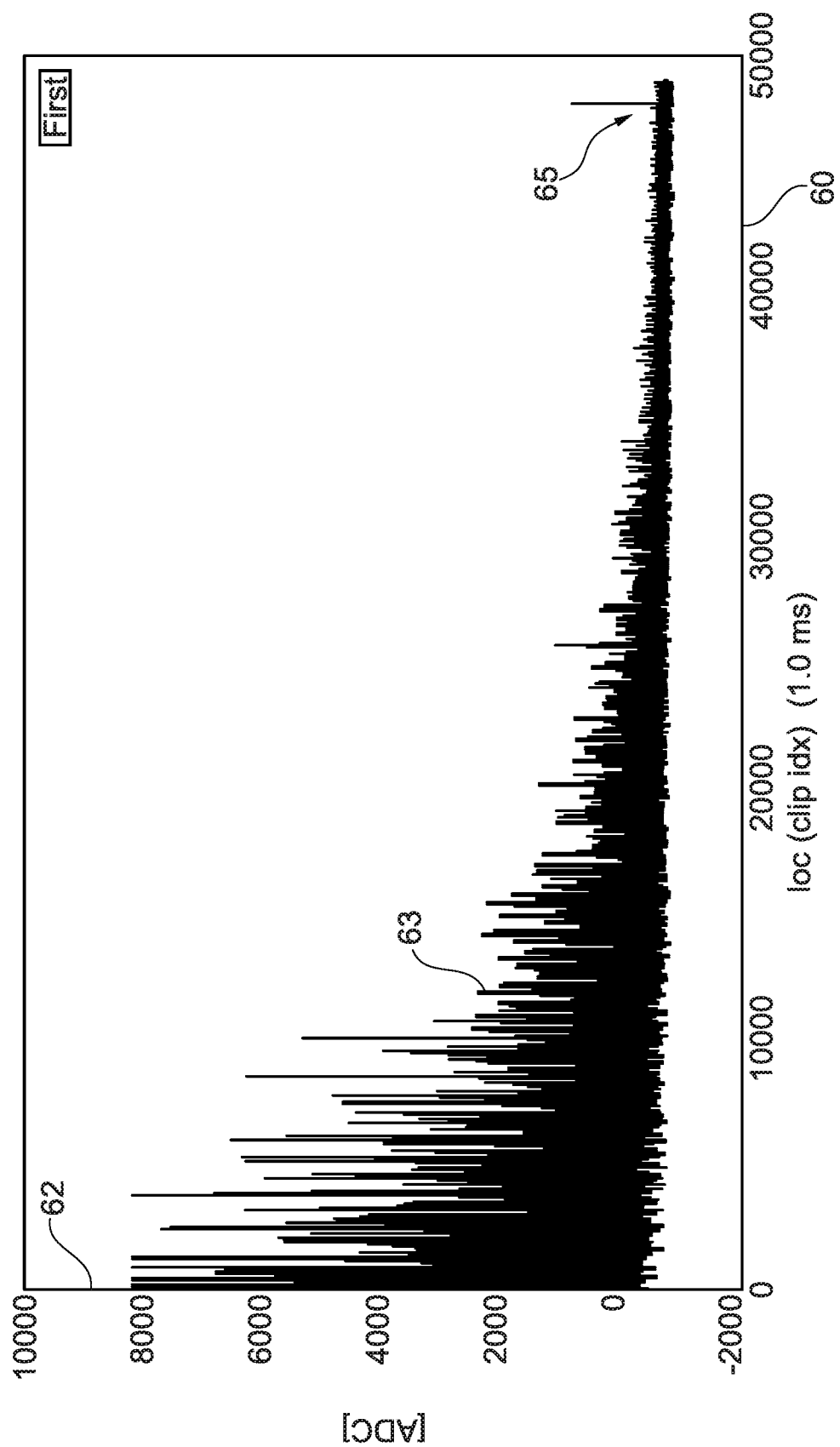
FIG. 3 illustrates a backscatter trace as obtained according to embodiments of the present invention.
Figure 4:
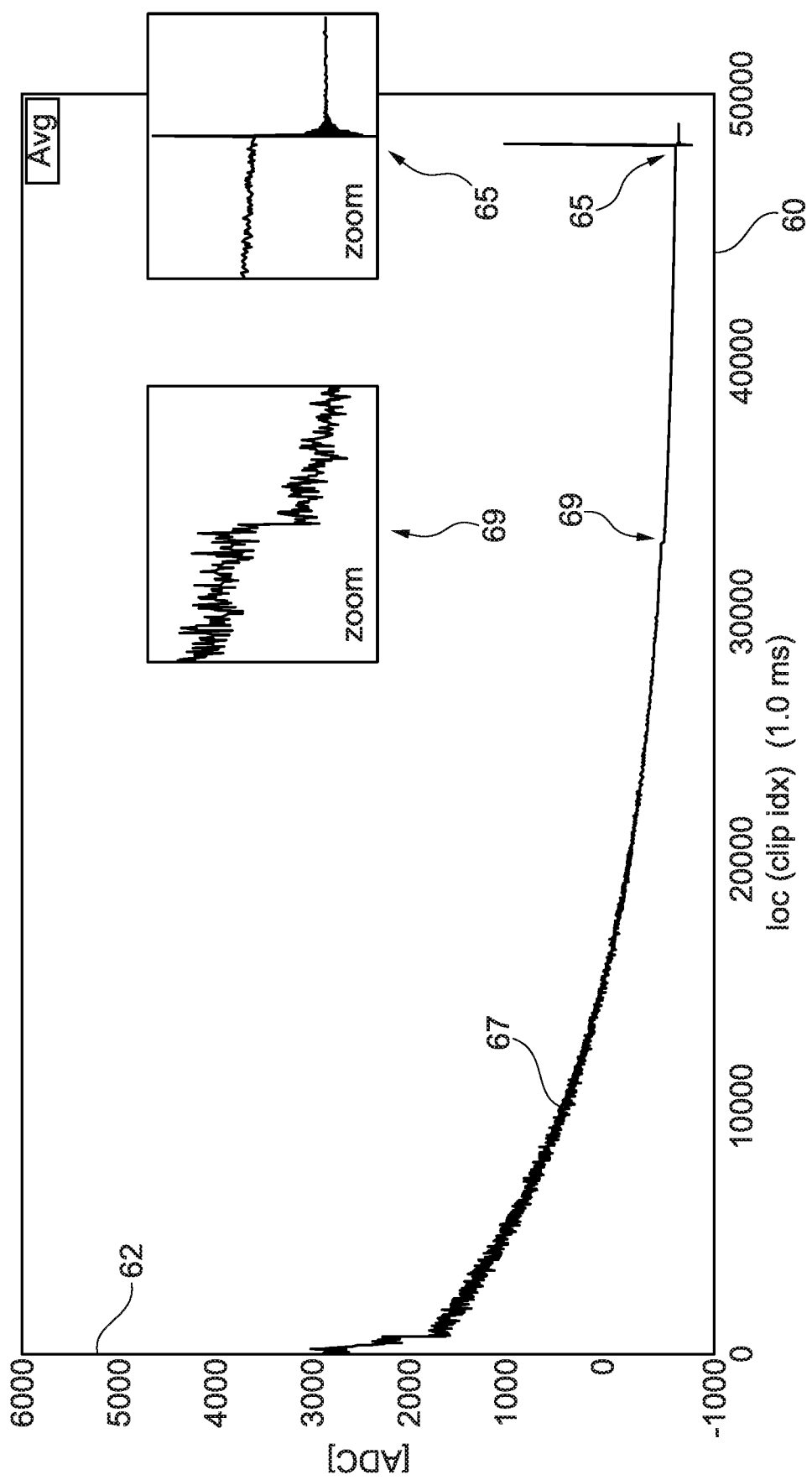
FIG. 4 illustrates an average of backscatter traces as obtained according to embodiments of the present invention.
Figure 5:
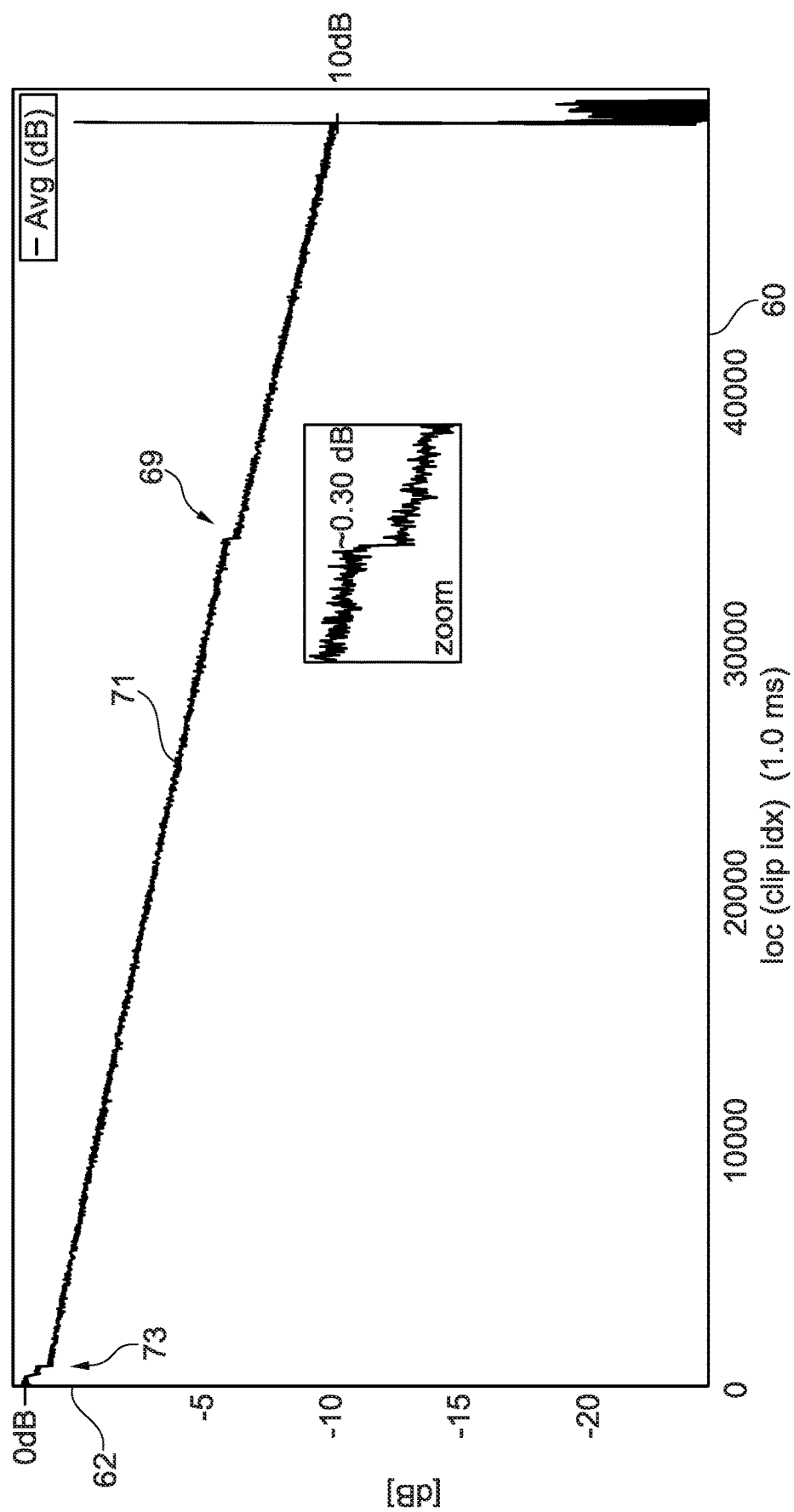
FIG. 5 illustrates the average of backscatter traces illustrated in FIG. 1 at a different scale.

FIGS. 3, 4 and 5 illustrate graphs in a coordinate system having as an abscissa 60 a location along the optical fiber 5 (illustrated in FIG. 1). The ordinate 62 denotes the intensity of the light detected by detector 7.

FIG. 3 illustrates a single trace 63, as acquired during the first operation mode and/or the second operation mode. The trace 63 may be considered as an example of detected first backscatter dependent light 31 or in particular first backscatter light 23 as is indicated in FIG. 1. From the trace 63, the fiber end expected where the arrow 65 points cannot be identified or detected. When all backscatter due to the injection of the first light pattern has returned from the optical fiber, a second light pattern may be injected having the same wavelength and a backscatter change may then be derived, in order to determine a time change of the characteristic of the fiber, due for example to acoustic disturbance.

FIG. 4 illustrates in an exemplary manner a backscatter average as obtained by operating the arrangement 1 illustrated in FIG. 1 in the second operation mode. In particular, backscatter light portions were averaged while the wavelength of the coherent laser 15 was changed, in particular thermally tuned, by ~0.1 nm. Thereby, around 1000 backscatter light portions were detected and averaged. As can be taken from the thereby determined backscatter average trace 67, the end of the fiber 65 as well as a connector position where the arrow 59 points can be identified. Thereby, integrity monitoring of the optical fiber 5 and also the connector 9 is enabled by operating the arrangement in the second operation mode.

FIG. 5 illustrates the trace 67 in a log-scale to arrive at a trace 71 representing a backscatter average trace. The connector at the arrow 69 can clearly be recognized. Furthermore, further connectors can be identified close to start region 73 of the monitored spatial range.

The arrangement 1 may use hardware conventionally applied to perform distributed acoustic sensing employing Rayleigh backscattering comprising a highly coherent laser. In the first, as well as the second operation mode, a common (coherent) laser may be used mostly using same optical components and optical paths. In particular, no optical switch is needed. Fiber monitoring may be repetitively or cyclically performed (for example check loss once per hour, e.g. H-darkening, sensor squeeze). The trace such as trace 71 illustrated in FIG. 5 may be compared with a reference trace.

The laser 15 may be tuned for different wavelengths by applying different temperatures, may be tuned electro-optically, or may be tuned acousto-optically. During the second operation mode, at least two backscatter traces from at least two different light patterns differing in at least one parameter affecting the coherent backscatter speckle pattern may be acquired. The two different light patterns, in particular other first light pattern and other second light pattern, may in particular differ in light frequencies. They may differ for example up to 0.8 nm. Further, the light patterns may differ in the envelope (intensity shape or intensity profile) for example in pulse length or in an on-off pattern.

From the detected backscatter signal, a quantity related to fiber loss may be extracted
Intensity DAS: Traces are already backscatter intensities (noisy because of coherent speckle, noise reducing with number of different backscatters);
Phase DAS: Use the absolute part of the extracted complex phasor as intensity curve. Optionally in case of heterodyne architecture: use the amplitude of the detector amplitude at or around the het carrier frequency (example: 80 MHz+−20 MHz for 5 m pulse length) (again, all noisy due to coherent speckle);

To calculate loss from the backscatter intensity, usually in dB may be according to $Loss_{dB}=10*\log_{10}(Int)+Offs$, where Offs is an arbitrary offset, usually selected so that the loss trace starts at 0 dB.
Averaging the extracted/traces over time (i.e. from different stimuli) removes the problematic coherent speckle/noise.
Averaging may take different traces with different weights, like: Use a lower weight for traces where the speckle pattern are similar because the stimuli vary only little (e.g., optical frequency varied by less than about 100 MHz from pulse to pulse)[e1].
Or use lower weight on traces with stronger stimulus energy (e.g., due to longer pulses or due to changing laser power with temperature). This is equivalent to normalizing traces to the same level.
Estimate the similarity/degree of variation from the stDev (standard deviation) of the trace data over time (while changing said stimulus) at one or more locations.
Detect coherent (speckled) signal, average then electronically (rather than averaging by detector/analog).

According to an embodiment, a method comprises: using at least one coherent light source, sending pulses of practically the same wavelength from pulse to pulse into a sensor fiber, detecting the Rayleigh backscatter from each pulse at the same wavelength as the pulse, analyzing changes in the backscatter between pulses for deriving local changes over time in the optical path length along the fiber (=DAS mode); using the same laser (at the same time or by switching the operation mode) with changing wavelength over time for sending pulses of substantially different wavelengths into the same sensing fiber and over the same connectors/connections and detecting the Rayleigh backscatter at the same wavelength as the pulse from said varying wavelengths, analyzing the backscatter for the strength of the Rayleigh backscatter per said varying pulse wavelengths, averaging said strengths and deriving a curve of Rayleigh backscatter strength along the fiber indicative for the loss along the fiber (=OTDR mode with removed speckle-noise).

Quasi-static/small optical frequency drifts are allowed in DAS-mode (e.g. first operational mode), they create low acoustic frequency strain artifacts (e.g. drifts of <100 MHz/s causing artifacts at <1 Hz which is out the of scope of acoustic measurements). Here we would allow such small drifts to enable slow OTDR measurements at the same time, e.g. with 1 h measurement time.

Drifting the laser wavelength slowly over time (e.g. less than 100 MHz/s) may allow DAS measurement and OTDR measurement at the same time. Getting an OTDR trace with sufficiently reduced coherent noise make take a longer time (e.g. hours), but that is sufficient in many applications for permanent/live monitoring of the fiber and detection of degradation over time. Further modifying additionally the laser optical amplitude and/or phase within the pulse (more general: "light pattern") may be performed, (e.g., shift the phase of the optical wave by Tr during a fraction of the pulse time). Like wavelength shifting, this also modifies the speckle pattern, so can additionally or alternatively be used to create statistical variation of the coherent noise (temporal speckle) pattern. This may e.g. overcome an insufficient speckle suppression due to limited wavelength tuning range (e.g. limited by the tunability of the used laser or due to be bound to the channel width of WDMs or other optical components).

It should be noted that the term "comprising" does not exclude other elements or steps and the article "a" or "an" does not exclude a plurality. Also, elements described in association with different embodiments may be combined.

Implementation of the invention is not limited to the preferred embodiments shown in the figures and described above. Instead, a multiplicity of variants is possible which variants use the solutions shown and the principle according to the invention even in the case of fundamentally different embodiments.

The invention claimed is:

1. An arrangement for distributed acoustic sensing and sensor integrity monitoring, comprising:
a light launching module adapted to generate light patterns and arranged to inject the generated light patterns into an optical fiber;
a detector arranged to detect Rayleigh backscatter dependent light returned from the optical fiber,
wherein the arrangement is adapted to operate in a first operation mode and in a second operation mode,
wherein in the first operation mode the arrangement is adapted:
to inject a first light pattern and to successively inject a second light pattern having substantially same wavelength, both generated using the light launching module, into the fiber;
to determine a backscatter change between first backscatter dependent light and second backscatter dependent light detected by the detector; and
to analyze the backscatter change to determine a time change of a characteristic of the fiber,
wherein in the second operation mode the arrangement is adapted:
to inject another first light pattern and successively another second light pattern, in particular having a wavelength different from a wavelength of the other first light pattern, both generated using the light launching module, into the fiber;
to determine a backscatter average of other first backscatter dependent light and other second backscatter dependent light detected by the detector; and
to analyze the backscatter average to determine a static characteristic of the fiber.

2. The arrangement according to claim 1, further comprising:
a connector coupled to the light launching module and connectable to the optical fiber,
wherein the arrangement is adapted to determine a static characteristic of the connector by operating in the second operation mode.

3. The arrangement according to claim 1, wherein in the first operation mode the arrangement is adapted:
to inject a light pattern sequence comprising successive light patterns including the first light pattern and the second light pattern, pairs of immediately successively injected light patterns having essentially a same wavelength;
to determine a backscatter change sequence between successive backscatter light portions due to successive backscatter form the light pattern sequence; and
to analyze the backscatter change sequence to determine a time evolution of the characteristic of the fiber.

4. The arrangement according to claim 1, wherein the other first light pattern and the other second light pattern differ in at least one parameter affecting a coherent backscatter speckle profile, in particular have different wavelengths and/or different polarization states and/or different intensity profiles and/or pulse lengths.

5. The arrangement according to claim 1, wherein in the second operation mode the arrangement is adapted:
to inject another light pattern sequence comprising successive other light patterns including the other first light pattern and the other second light pattern, pairs of immediately successively injected other light patterns having in particular differing wavelengths and/or differing polarization states and/or different intensity profiles and/or pulse lengths;
to determine the backscatter average based on an average over the other successive backscatter dependent light portions due to successive backscatter form the other light pattern sequence and/or
wherein the backscatter average comprises a spatially resolved backscatter for different regions along the fiber and/or the connector.

6. The arrangement according to claim 1, wherein to determine the backscatter average of the other first backscatter dependent light and other second backscatter dependent light or over the other successive backscatter dependent light portions comprises:
weighting the other first backscatter dependent light and the other second backscatter dependent light or the other successive backscatter dependent light portions, in order to apply a normalization regarding injected light power and/or number (or density) of detections of the backscatter dependent light portions in a wavelength range, in particular including:
weighting those other backscatter dependent light portions the higher, the lower the injected light power of the respective other light pattern; and/or
weighting those other backscatter dependent light portions the higher, the smaller the number (or density) of detections of the backscatter dependent light portions in a wavelength range of the associated injected other light patterns; and/or
weighting those other backscatter dependent light portions the smaller, the smaller a wavelength change rate of the associated injected other light patterns.

7. The arrangement according to claim 1,
wherein an absolute value of a light frequency difference between the first light pattern and the second light pattern or between subsequent light patterns of the light pattern sequence is between 0 Hz and 500 MHz divided by a light pattern length in ns, in particular between 0 MHz and 200 MHz divided by a light pattern length in ns, further in particular between 0 MHz and 100 MHz divided by a light pattern length in ns,
wherein an absolute value of another light frequency difference between the other first light pattern and the other second light pattern or between subsequent light patterns of the other light pattern sequence is greater than 0 Hz, in particular greater than 10 Hz, or 1 kHz, or 10 kHz, or 1 MHz, and smaller than 2.5 GHz, or smaller than 1 GHz or smaller than 500 MHz.

8. The arrangement according to claim 1, wherein the first operation mode provides distributed acoustic sensing and/or temperature sensing and/or distributed strain sensing,
wherein the second operation mode provides fiber and/or connector integrity monitoring.

9. The arrangement according to claim 1,
wherein the time evolution of the characteristic of the fiber comprises information regarding strain and/or acoustic disturbance and/or pressure and/or temperature of the fiber in different regions of the fiber at different time points and/or wherein the static characteristic comprises information regarding loss and/or defect and/or integrity and/or light transport property in different regions of the fiber and/or the connector.

10. The arrangement according to claim 1, wherein the arrangement is adapted to operate in the first operation mode and to successively operate in the second operation mode.

11. The arrangement according to claim 1, wherein the arrangement is adapted to operate in the first operation mode and to simultaneously and/or quasi simultaneously, in particular interdigitatedly, operate in the second operation mode,
wherein the first light pattern serves as the other first light pattern, and/or
wherein the second light pattern serves as the other second light pattern.

12. The arrangement according to claim 1, wherein to analyze the backscatter average comprises:
comparing the backscatter average with a reference trace to determine the static characteristic of the fiber and/or connector.

13. The arrangement according to claim 1,
wherein the first backscatter light and the second backscatter light comprises or is Rayleigh backscatter of the first light pattern and the second light pattern, respectively, in particular backscattered from different regions of the fiber,
wherein the other first backscatter light and the other second backscatter light comprises or is Rayleigh backscatter of the other first light pattern and the other second light pattern, respectively, in particular backscattered from different regions of the fiber and/or the connector.

14. The arrangement according to claim 1, wherein the light launching module comprises a single laser and is adapted to generate coherent light patterns with tunable wavelength.

15. A method of distributed acoustic sensing and sensor integrity monitoring, the method comprising in a first operation mode:
injecting a first light pattern and successively injecting a second light pattern having substantially same wavelength both generated using a same light launching module, into an optical fiber;
determining a backscatter change between first backscatter dependent light and second backscatter dependent light detected by a detector; and
analyzing the backscatter change to determine a time change of a characteristic of the fiber;
the method comprising in a second operation mode:
injecting another first light pattern and successively another second light pattern, both generated using the light launching module, into the fiber;
determining a backscatter average of other first backscatter dependent light and other second backscatter dependent light detected by the detector; and
analyzing the backscatter average to determine a static characteristic of the fiber.

* * * * *